(12) United States Patent
Wei et al.

(10) Patent No.: US 12,733,589 B2
(45) Date of Patent: Sep. 15, 2026

(54) OUTDOOR POWER MACHINE

(71) Applicant: Greenworks (Jiangsu) Co. Ltd., Changzhou (CN)

(72) Inventors: Qunli Wei, Changzhou (CN); Qinghua Shi, Changzhou (CN); Dongdong Shi, Changzhou (CN); Christopher Eichel, Charlotte, NC (US); Nicholas Suchoza, Charlotte, NC (US)

(73) Assignee: GREENWORKS (JIANGSU) CO. LTD. (CN)

(*) Notice: Subject to any disclaimer, the term of this patent is extended or adjusted under 35 U.S.C. 154(b) by 433 days.

(21) Appl. No.: 18/564,818

(22) PCT Filed: Sep. 13, 2022

(86) PCT No.: PCT/CN2022/118377
§ 371 (c)(1),
(2) Date: Nov. 28, 2023

(87) PCT Pub. No.: WO2024/055146
PCT Pub. Date: Mar. 21, 2024

(65) Prior Publication Data
US 2025/0089620 A1 Mar. 20, 2025

(51) Int. Cl.
*A01D 34/78* (2006.01)
*A01D 75/00* (2006.01)
(Continued)

(52) U.S. Cl.
CPC ........... *A01D 75/008* (2013.01); *A01D 34/78* (2013.01); *A01D 34/66* (2013.01);
(Continued)

(58) Field of Classification Search
CPC ...... A01D 75/008; A01D 34/78; A01D 34/66; A01D 2101/00; B60K 1/02; B60L 1/00; B60L 2200/40
(Continued)

(56) References Cited

U.S. PATENT DOCUMENTS 7,392,869 B2 * 7/2008 Carlson .................. A01D 69/02 180/53.5
7,908,833 B2 * 3/2011 Nicholson .............. A01D 34/66 56/11.9
(Continued)

FOREIGN PATENT DOCUMENTS

CN 1957655 5/2007
CN 105850346 8/2016
(Continued)

OTHER PUBLICATIONS

Translation of CN 214314691U accessed on Mar. 27, 2026 at www.espacenet.com (Year: 2021).*
(Continued)

*Primary Examiner* — James A Shriver, II
*Assistant Examiner* — Hilary L Johns
(74) *Attorney, Agent, or Firm* — Shumaker, Loop & Kendrick, LLP; Brandon C. Trego

(57) ABSTRACT

An outdoor power machine includes: a chassis including main frame rails; two or more drive wheel assemblies physically mounted to the chassis, each drive wheel assembly coupled to an electric motor; an electric power pack configured to supply electric energy to the electric motors; one or more steer wheels; and at least one storage plate connected to the outdoor power machine, the storage plate configured to carry an item thereon.

17 Claims, 18 Drawing Sheets

(51) Int. Cl.
*A01D 34/66* (2006.01)
*A01D 101/00* (2006.01)
*B60K 1/02* (2006.01)
*B60L 1/00* (2006.01)

(52) U.S. Cl.
CPC ............ *A01D 2101/00* (2013.01); *B60K 1/02* (2013.01); *B60L 1/00* (2013.01); *B60L 2200/40* (2013.01)

(58) Field of Classification Search
USPC ........................................................ 180/65.1
See application file for complete search history.

(56) References Cited

U.S. PATENT DOCUMENTS 8,006,786 B1 * 8/2011 Chapman ............. A61G 5/1094 280/32.7
10,130,037 B2 * 11/2018 Conrad .................. A01D 69/02
10,334,777 B2 * 7/2019 Uemura ............... A01D 34/008
10,729,073 B2 * 8/2020 Bryant ................... A01D 34/82
11,317,564 B2 * 5/2022 Conrad .................. A01D 34/78
12,252,058 B1 * 3/2025 Rood, Jr. .............. B60P 3/2215
12,457,922 B2 * 11/2025 Peters .................... A01D 34/64
2007/0095039 A1 * 5/2007 Carlson ................ A01D 34/006 56/10.6
2009/0183479 A1 * 7/2009 Nicholson .............. A01D 34/66 56/14.7
2010/0139232 A1 * 6/2010 Nicholson .............. A01D 34/82 56/320.1
2016/0183451 A1 * 6/2016 Conrad .................. A01D 34/66 56/10.2 R
2018/0338416 A1 * 11/2018 Uemura ............... A01D 34/008
2019/0059227 A1 * 2/2019 Conrad .................. A01D 34/78
2019/0075724 A1 * 3/2019 Becke .................. A01D 34/008
2019/0133039 A1 * 5/2019 Bryant ................... A01D 34/64
2020/0187417 A1 * 6/2020 Takaoka ................. A01D 34/64
2020/0207300 A1 * 7/2020 Tada ...................... A01D 75/20
2020/0298785 A1 * 9/2020 Turner .................. B60R 21/131
2022/0232762 A1 * 7/2022 Peters ................ A01D 34/6812
2023/0122499 A1 * 4/2023 Holeton ................. A01D 34/78 320/109

FOREIGN PATENT DOCUMENTS

| | | | |
|---|---|---|---|
| CN | 209710732 | | 12/2019 |
| CN | 112671075 | | 4/2021 |
| CN | 214314691 | | 9/2021 |
| CN | 214314691 U | * | 9/2021 |
| CN | 114793598 | | 7/2022 |

OTHER PUBLICATIONS

International Search Report and Written Opinion for relating International Patent Application No. PCT/CN2022/118377 issued on May 31, 2023.

* cited by examiner

OUTDOOR POWER MACHINE

BACKGROUND OF THE INVENTION

This invention relates generally to outdoor power equipment, and more particularly to self-propelled outdoor power machines.

BACKGROUND

Various types of outdoor power machines are known. Examples of common machines include lawn mowers and lawn tractors. Some outdoor power machines have an operator seat and are considered “ride-on”, “riders”, or “riding” machines. Others accommodate an operator in a standing position, described as a “stand-on” or “stander” machine.

Some known outdoor power machines are battery powered. They include a battery pack which provides electric power for the primary operating components of the machine, such as the drive wheels and mower deck or other powered implements. The battery pack also provides electric power for controls, displays, and accessories of the machine.

One problem with prior art outdoor power machines is that they lack means for storing items, carrying and/or transporting items or implements, and powering such items or implements.

BRIEF SUMMARY OF THE INVENTION

This problem is addressed by an outdoor power machine including an electric power takeoff, storage containment, and storage plates for carrying items and/or implements.

According to one aspect of the technology described herein, an outdoor power machine includes a chassis including main frame rails; two or more drive wheel assemblies physically mounted to the chassis, each drive wheel assembly coupled to an electric motor; an electric power pack configured to supply electric energy to the electric motors; one or more steer wheels; and at least one storage plate connected to the outdoor power machine, the storage plate configured to carry an item thereon.

According to another aspect of the technology described herein, an outdoor power machine includes a chassis including main frame rails; two or more drive wheel assemblies physically mounted to the chassis, each drive wheel assembly coupled to an electric motor; an electric power pack positioned between the main frame rails and configured to supply electric energy to the electric motors; one or more steer wheels; and at least one storage plate connected to the outdoor power machine, the storage plate configured to carry an item thereon.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
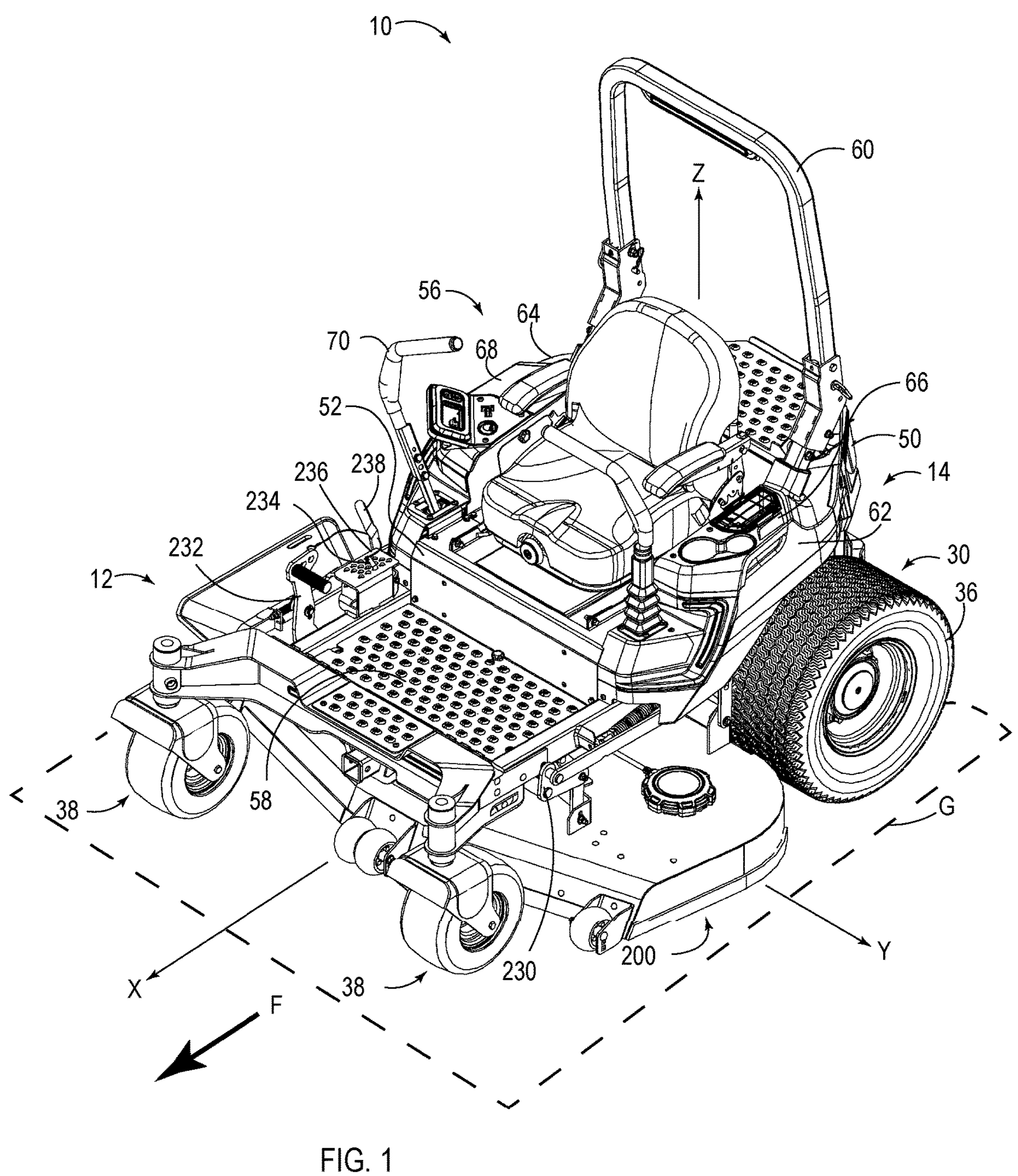
FIG. 1 is a front perspective view of an exemplary ride-on zero-turn outdoor power machine.
Figure 2:
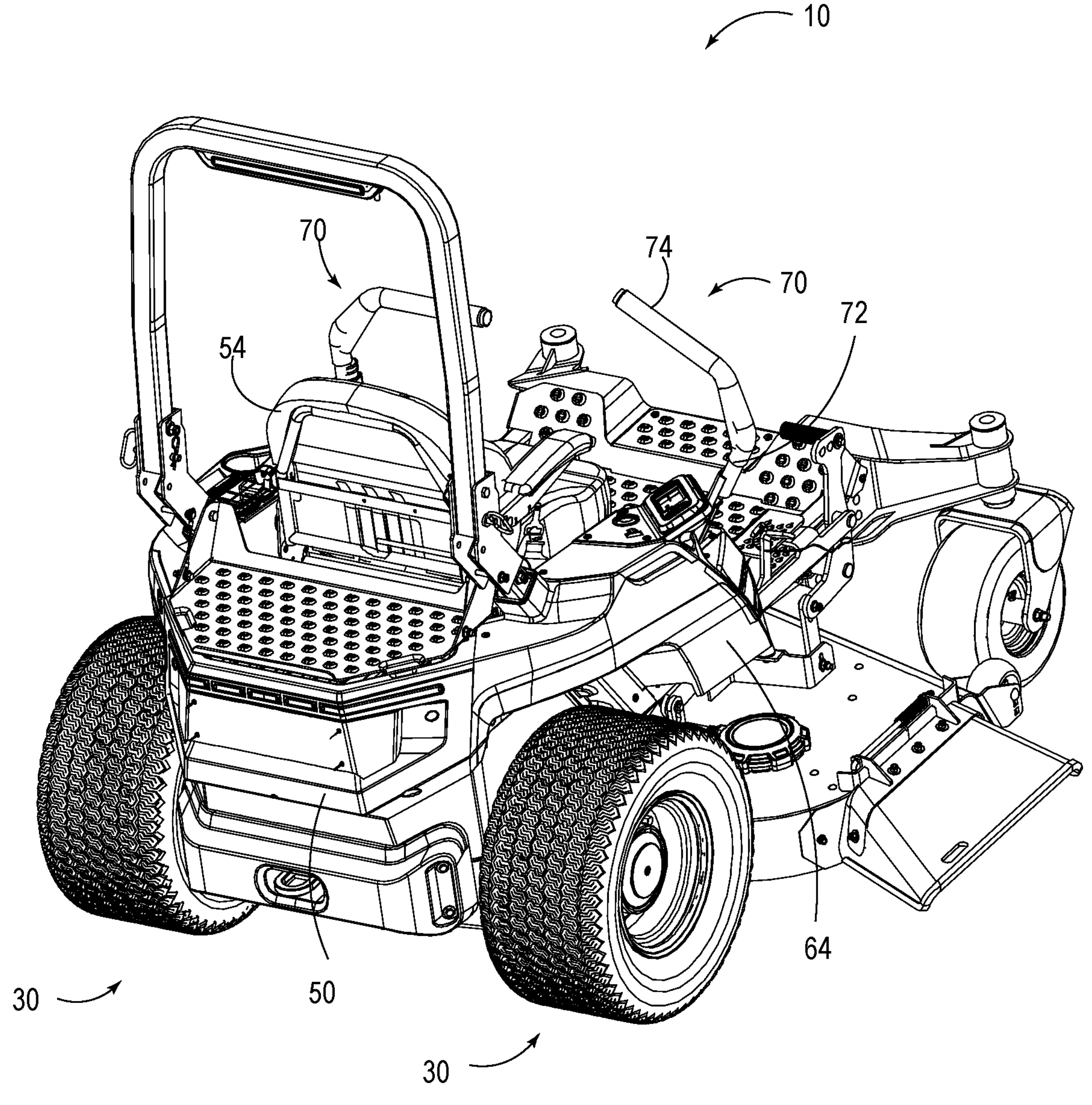
FIG. 2 is a rear perspective view of the machine of FIG. 1.
Figure 3:
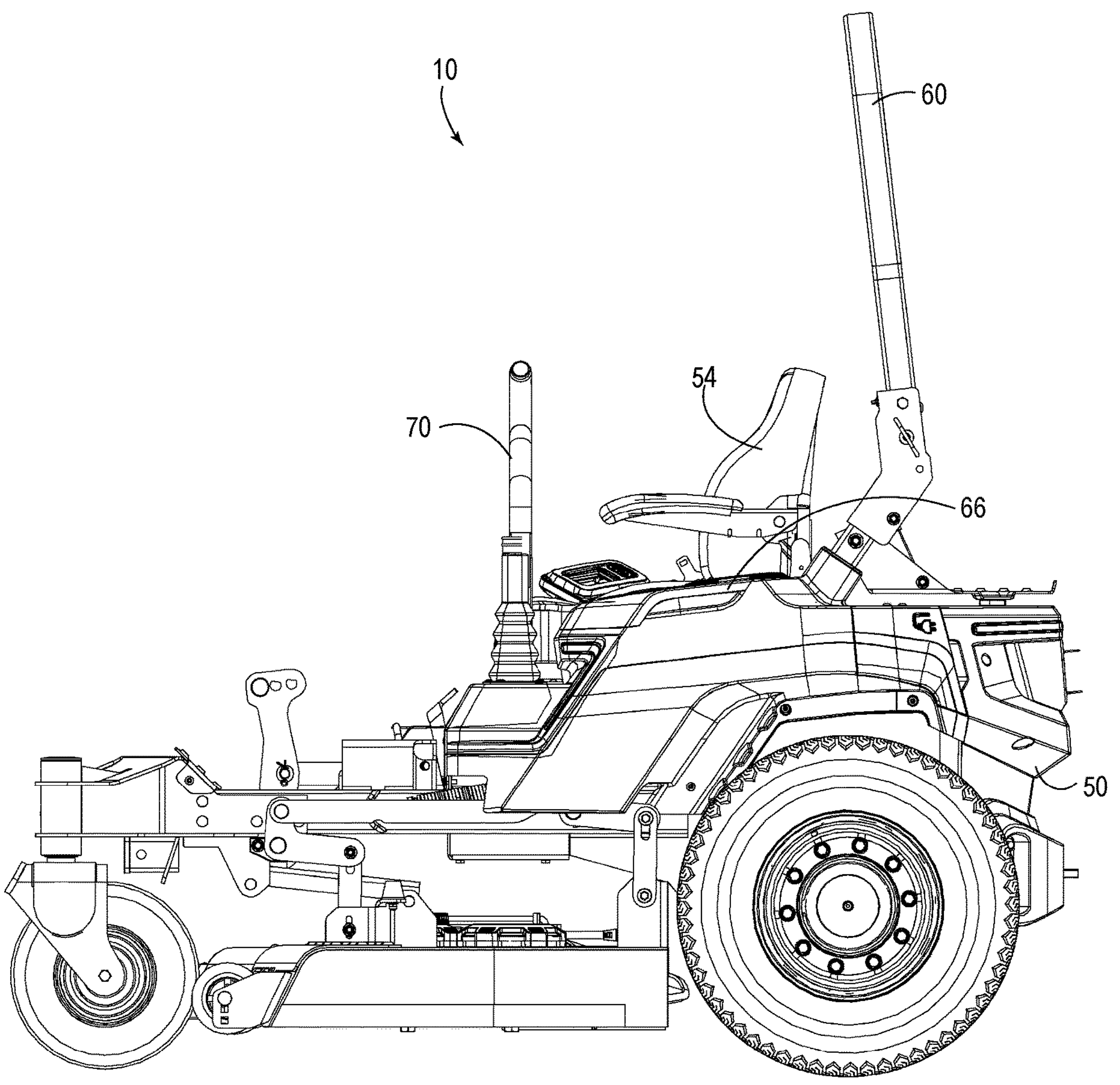
FIG. 3 is a side elevation view of the machine of FIG. 1.

Referring to the drawings wherein identical reference numerals denote the same elements throughout the various views, FIGS. 1-3 show a representative embodiment of an outdoor power machine 10. The machine 10 extends along an axial direction (arrow “X”) between a front end 12 and a rear end 14. The points of contact of the wheels of the machine 10 collectively define a ground plane “G”.

It is noted that, as used herein, the terms “axial” and “longitudinal” both refer to a direction parallel to the axis X, while “vertical” refers to a direction perpendicular to the axial direction and to the ground plane G (see arrow “Z” in FIG. 1) and “lateral” refers to a direction mutually perpendicular to the axial and vertical directions (see arrow “Y” in FIG. 1). A primary forward direction of ground travel is shown by the arrow “F” in FIG. 1. These directional terms are used merely for convenience in description and do not require a particular orientation of the structures described thereby.

In the illustrated example, the outdoor power machine 10 is a zero-turn-radius type machine, alternatively referred to as a “zero-turn” machine. This type of machine is capable of changing its direction of travel (heading) without significant forward or backward movement. This is accomplished by differential rotation of drive wheels on opposite sides of the machine 10 to produce a yawing motion. For example, rotating the right-side wheel forward and simultaneously rotating the left-side wheel backward at the same wheel speed (RPM) will cause the machine 10 to yaw (turn) to the left without moving forwards or backwards. Related steering effects may be obtained by rotating drive wheels on opposite sides in different directions and different wheel speeds, by holding one wheel stationary while driving the opposite-side wheel in a chosen direction, or by rotating the wheels on opposite sides in the same direction at different wheel speeds.

The principles described herein are also applicable to a non zero-turn mower (not shown) using a conventional steering linkage to pivot (steer) some or all of the wheels.

In the example shown in FIGS. 1-3, the machine 10 is a ride-on machine (alternatively referred to as a "rider" or "riding machine").

Figure 4:
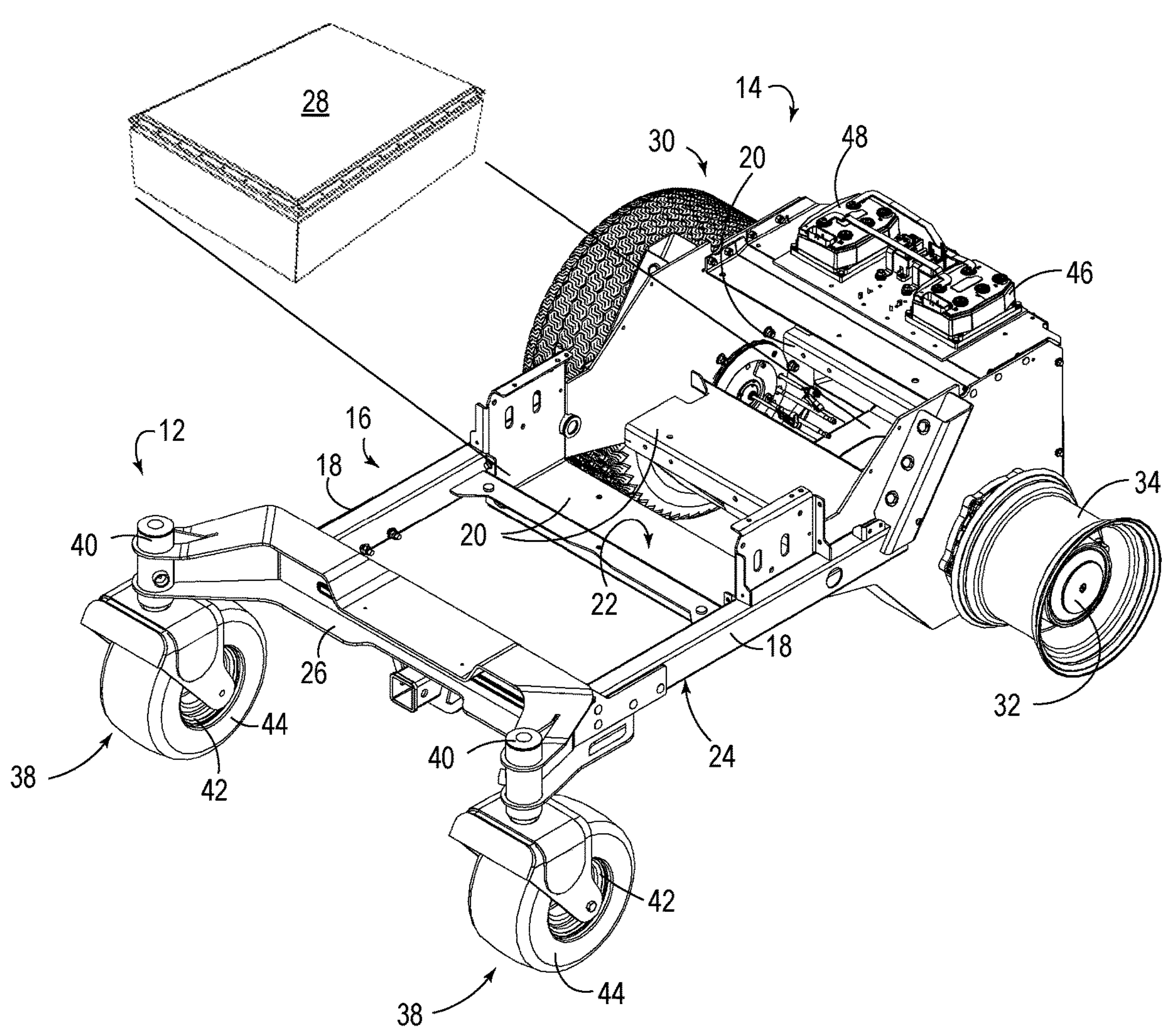
FIG. 4 is a perspective view of a chassis of the machine of FIG. 1.

The machine 10 has a chassis 16 (FIG. 4) which provides structural support as well as mounting locations for the various components of the machine 10. Any material with adequate structural strength may be used to construct the chassis 16. Examples of suitable materials include metals such as aluminum and steel and their alloys. The chassis 16 may be monolithic or may be built up from smaller components, e.g., via fasteners, adhesives, or welding.

The chassis 16 includes a pair of spaced-apart main frame rails 18 extending in a longitudinal direction from the front end 12 of the machine 10 to the rear end 14 of the machine 10. Cross-members 20 interconnect the main frame rails 18. Top surfaces 22 of the cross-members 20 are positioned even with or lower than the bottom surfaces 24 of the main frame rails 18.

A front axle assembly 26 interconnects the main frame rails 18 at the front end 12 of the machine 10.

The machine 10 is equipped with an electric power pack 28 suitable for storing and discharging electric energy. In the illustrated example, the electric power pack 28 is a storage battery including one or more chemical cells, for example lithium ion cells. Other liquid battery chemistries may be substituted, as well as solid state batteries, capacitors, or similar devices which may exist currently or be later developed. The electric power pack 28 may include ancillary electric components such as inverters, transformers, voltage converters, relays, circuit breakers, and/or sensors. In the illustrated example, the electric power pack 28 includes at least one set of terminals providing a high voltage output (e.g. 82 V) for operating the primary components of the machine 10, such as the drive wheels and mower deck or other powered implement. It also includes another set of terminals providing a low voltage output (e.g. 12 V) for operating the control systems of the machine 10 as well as certain accessories.

The electric power pack 28 is positioned on the cross-members 20 and may be secured by fasteners, clips, latches, or the like (not shown).

The electric power pack 28 is positioned such that some portion of it is located at or below the bottom surfaces 24 of the main frame rails 18. Stated another way, the electric power pack 28 is positioned "between" the main frame rails 18, rather than sitting above or on top of the main frame rails 18.

The machine 10 is equipped with a drive wheel assembly 30, one on each side. Each drive wheel assembly 30 includes an integral drive hub 32 containing an internal electric motor, gear reduction drive, an optional brake (not separately illustrated), a drive wheel 34, and a tire 36 mounted to the drive wheel 34. It is noted that wheels having a ground-engaging surface, and thus not requiring a separate tire, are known in the art. The integral drive hub 32 is physically mounted to the chassis 16 such that the drive wheel 34 can rotate relative to the chassis 16. As will be described in further detail, the machine 10 is configured such that the wheel speed and direction of rotation can be controlled independently for the left- and right-side drive wheel assemblies 30. In the illustrated example, the drive wheel assemblies 30 are located at or near the rear end 14 of the machine 10. Alternatively, the drive wheel assemblies 30 could be located at or near the front end 12 of the machine 10.

The machine 10 is equipped with left- and right-side steer wheel assemblies 38. Each steer wheel assembly 38 includes a pivot assembly 40, a steer wheel 42, and a tire 44 mounted to the steer wheel 42. It is noted that wheels having a ground-engaging surface, and thus not requiring a separate tire, are known in the art. Each steer wheel assembly 38 is mounted to the chassis 16 such that the steer wheel 42 can rotate relative to the chassis 16 as well as pivot freely about an upright (vertical or near-vertical) axis. The steer wheel assemblies 38 function as casters and therefore passively steer the machine 10. As noted above, the principles described herein are also applicable to a non zero-turn mower (not shown) using a conventional steering linkage to pivot (i.e., actively steer) some or all of the wheels.

The machine 10 is equipped with suitable electric connections, controls, and switching equipment to permit the operator to control the drive functions of the machine 10. In the illustrated example, the machine 10 includes a left drive motor controller 46 and a right drive motor controller 48. Each of these drive motor controllers 46, 48 includes an electric power connection to the electric power pack 28 as well as connections to operator controls as described below. Each drive motor controller 46, 48 is operable to receive a command signal from an operator control and to provide electric power to drive its associated drive wheel assembly 30 at the commanded wheel speed and direction.

The machine 10 includes a body 50 or superstructure positioned above the chassis 16. The body 50 functions to enclose the operating components of the machine 10, to provide the mounting structure for controls and accessories of the machine 10, and to provide a desired external appearance.

The body 50 includes a battery cover assembly 52 which encloses the electric power pack 28.

An operator seat 54 is mounted on top of the battery cover assembly 52. The operator seat 54 may be adjustable in one or more directions, may include retractable armrests, and may include a seatbelt or other restraint for the operator. The battery cover assembly 52 and the operator seat 54 collectively define an "operator station" 56 which functions to support the operator in a position with access to machine controls during operation.

A foot deck 58 is mounted to the chassis 16 forward of the battery cover assembly 52. This serves as a support for the operator's feet. As illustrated, it may be provided with a raised tread structure to increase traction and avoid slippage.

A rollover protection system ("ROPS") 60 is mounted to the body 50 just aft of the operator seat 54. This is a hoop-like structure or rollbar which extends above the operator's head in the seated position. This functions to prevent injury to the operator should the machine 10 rollover in operation. In the illustrated example, the rollover protection system 60 can be folded down or removed to permit operations under low-hanging structures or vegetation, or to make the machine 10 more compact for transportation.

Figure 12:
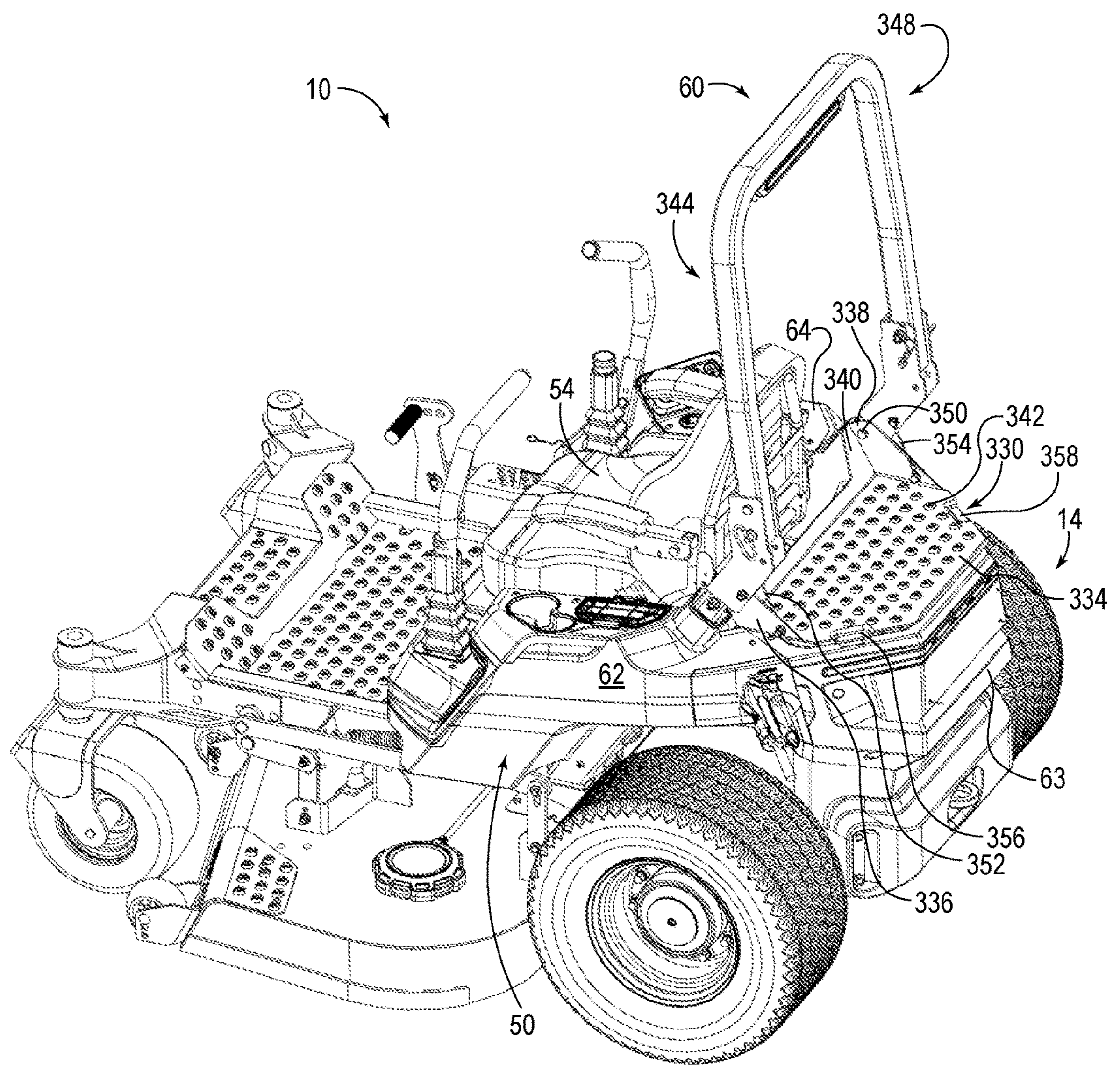
FIG. 12 is a perspective view of the machine of FIG. 1 showing a storage plate.
Figure 13:
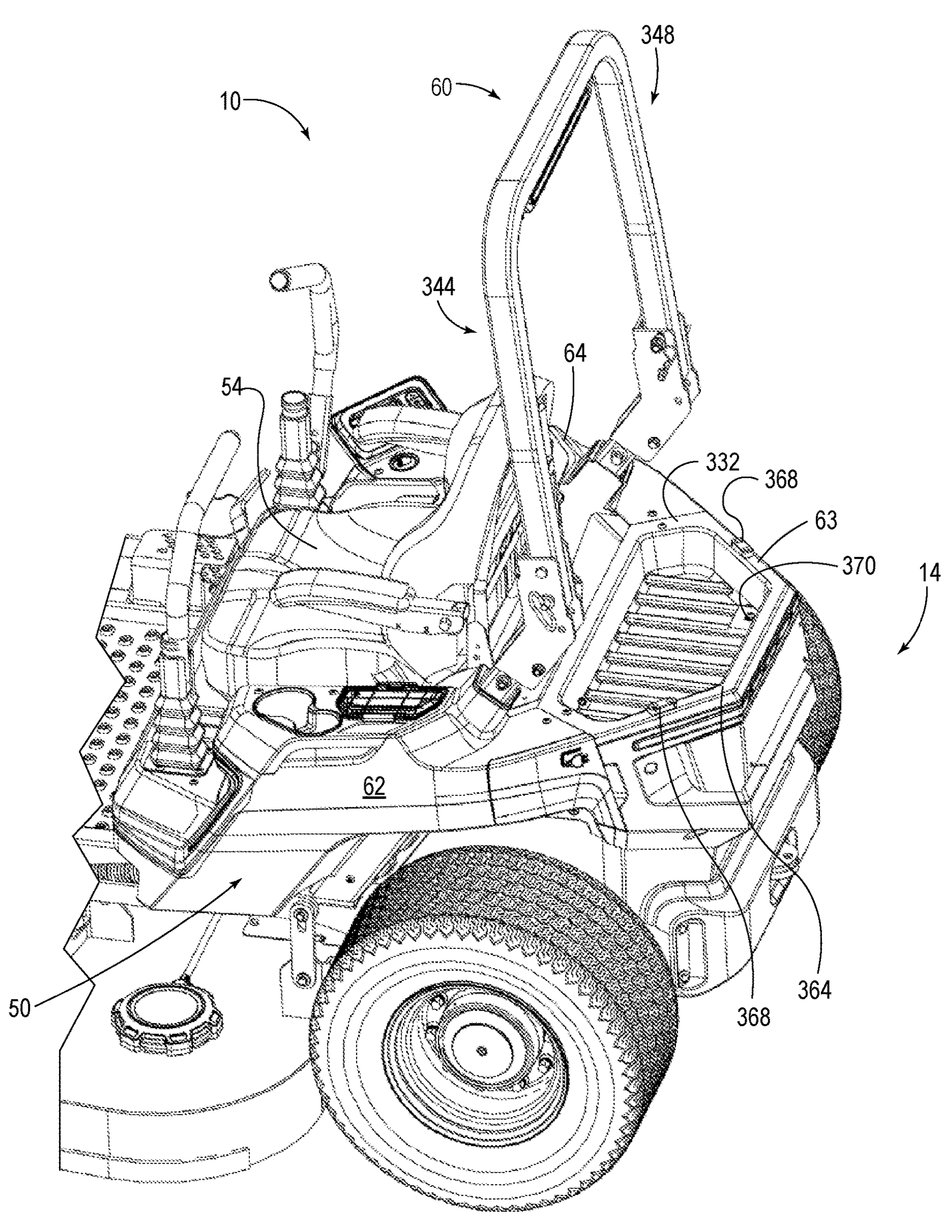
FIG. 13 is a perspective view of the machine of FIG. 12 showing a storage compartment.
Figure 14:
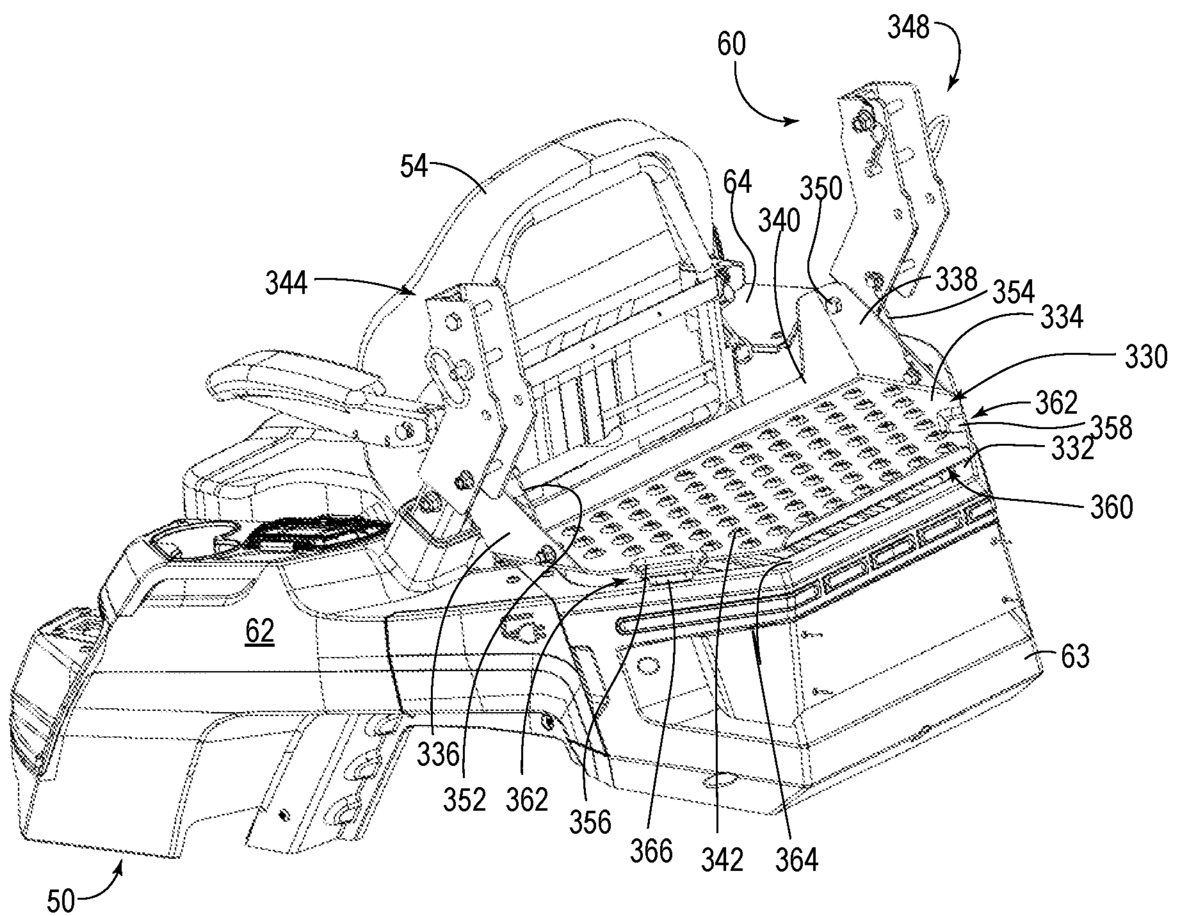
FIG. 14 is a perspective view of a body of the machine of FIG. 12.
Figure 15:
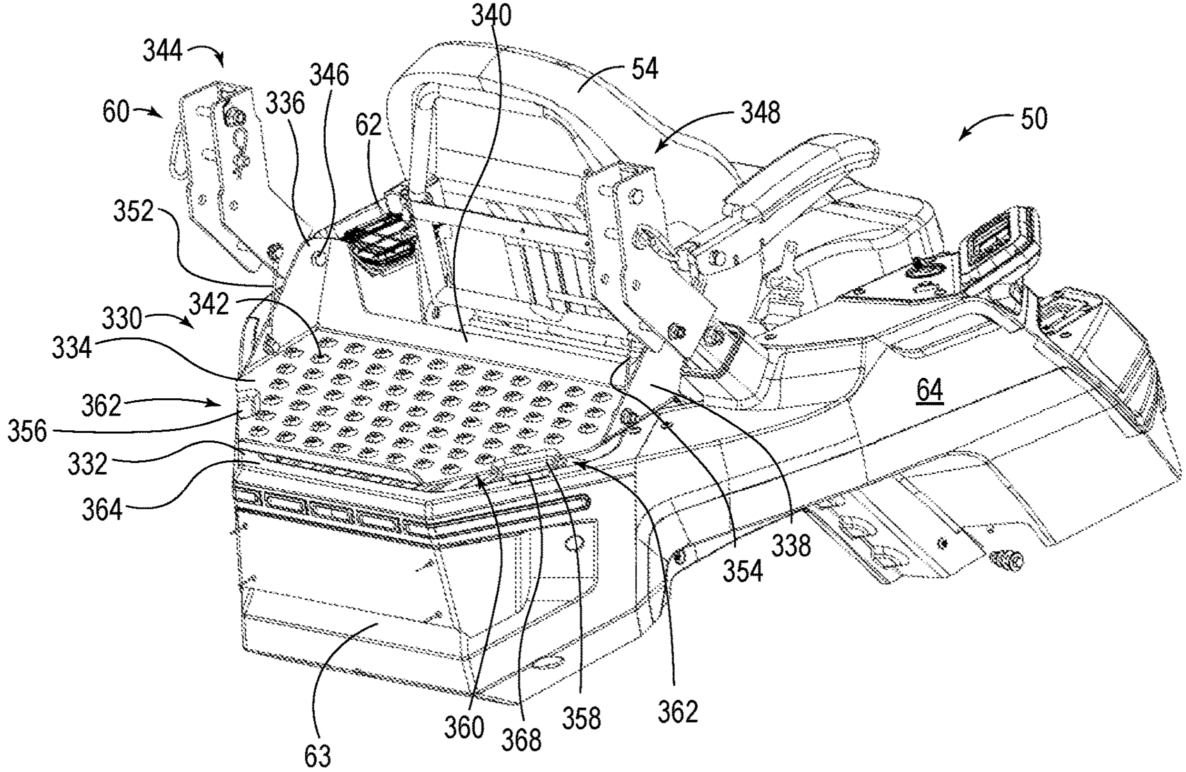
FIG. 15 is a perspective view of the body of FIG. 14
Figure 16:
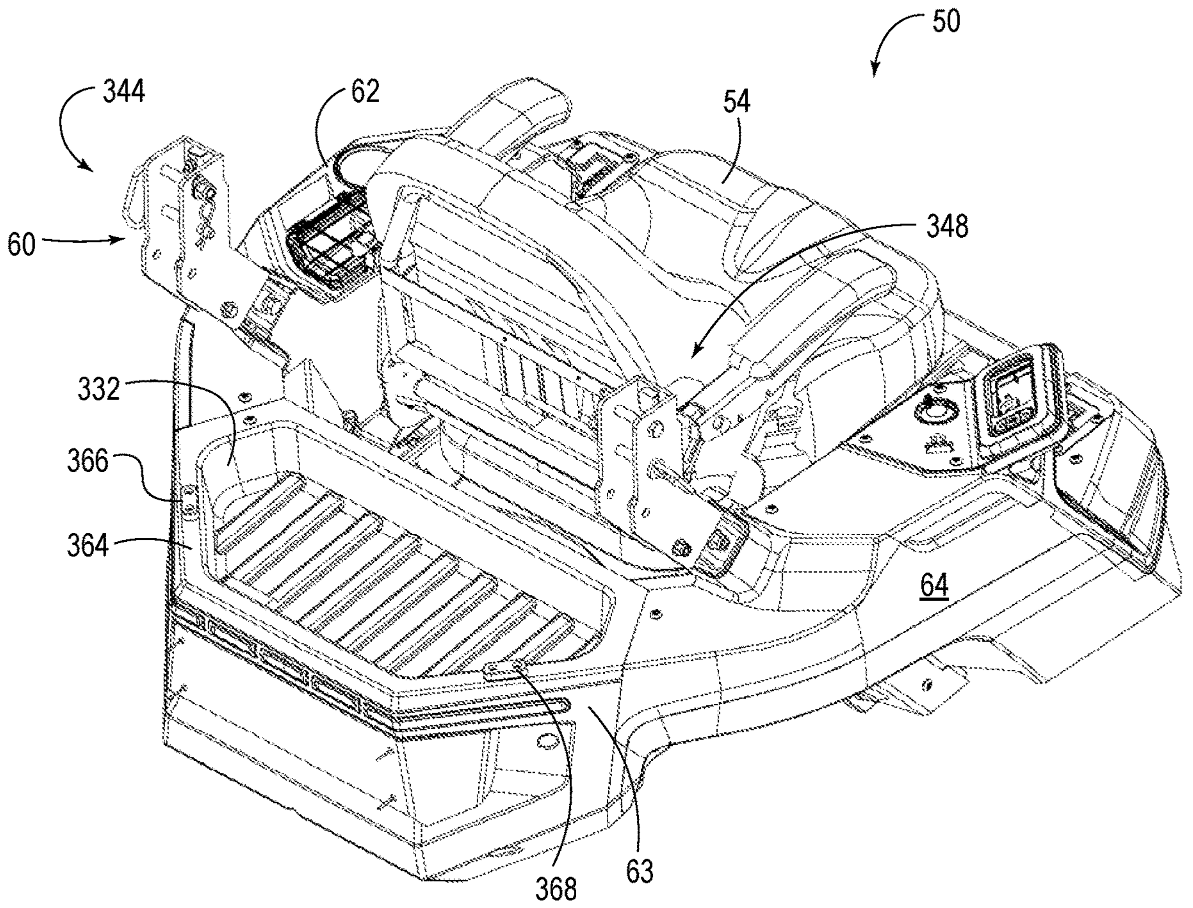
FIG. 16 is a perspective view of the body of FIG. 14 showing the storage compartment.

The body 50 includes left and right fenders 62, 64 respectively which flank the left and right sides of the operator seat 54. The left fender 62 is topped by a left console 66 and the right fender 64 is topped by a right console 68. The left and right fenders 62, 64 are connected at or near the rear end 14 of the machine 10 by a rear console 63 (FIG. 12).

The body 50 carries one or more operator controls within reach of the operator seat 54. The primary operator controls include a pair of steering levers 70, one for the left side and one for the right side. Each steering lever 70 is generally L-shaped and includes a vertical section 72 pivotally mounted to the body 50 near the forward edge of the operator seat 54, and a horizontal section 74 which extends from the top of the vertical section 72 towards the centerline X of the machine 10.

Each steering lever 70 is pivotally mounted such that it can move in a fore-aft direction to control drive wheel speed. More specifically, the steering lever 70 is spring-loaded to a neutral position which commands drive wheel speed to stop and/or apply a brake. Movement in the forward direction away from the neutral position commands forward wheel rotation, with RPM proportional to steering lever deflection. Movement in the rearward direction away from the neutral position commands reverse wheel rotation, with RPM proportional to steering lever deflection.

Each steering lever 70 is further pivotally mounted so that it can move in a lateral direction between an outboard parking position and a inboard use position.

Optionally, the machine 10 may be equipped with parking switches (not illustrated) which are operable to detect if the steering levers 70 are in the outboard position or the inboard position. The parking switches may be configured such that the machine drive wheel assemblies 30 cannot be operated unless both steering levers 70 are pivoted to the inboard position.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the left or right consoles 68, 70.

The outdoor power machine 10 may be used as follows. First, the operator sits in the operator seat 54 and activates the key switch or main power switch. A blade start/stop switch or other switch is used to turn on mowing blades or other powered implement, and the implement is adjust to an operating position, such as a desired cutting height for mowing. The steering levers 70 are moved from the outboard parking position to the inboard use position. The operator then uses the steering levers 70 to drive the outdoor power machine 10 in the desired direction while mowing or other implement operation takes place. It will be understood from the above description that manipulation of the steering levers 70 is sufficient to control forward and aft movement of the outdoor power machine 10, as well as braking and steering.

FIGS. 5-8 illustrate another exemplary embodiment of an outdoor power machine 110. This embodiment of the machine 110 is a stand-on machine (alternatively referred to as a "stander"). The overall construction of the machine 110 is similar to the machine described above. Elements of the machine 110 not explicitly described may be taken to be identical to the machine 110 described above.

The machine 110 has a chassis 116 including main frame rails 118 extending in a longitudinal direction from a front end 112 of the machine 110 to a rear end 114 of the machine 110. Cross-members 120 interconnect the main frame rails 118. A front axle assembly 126 interconnects the main frame rails 118 at the front end 112 of the machine 110.

The machine 110 is equipped with an electric power pack 128 as described above.

The machine is equipped with left- and right-side drive wheel assemblies 130. Each drive wheel assembly 130 includes an integral drive hub 132 containing an electric motor, a gear reduction drive, and an optional brake (not separately illustrated), a drive wheel 134, and a tire 136 mounted to the drive wheel 134. It is noted that wheels having a ground-engaging surface, and thus not requiring a separate tire, are known in the art. In the illustrated example, the drive wheel assemblies 130 are located at or near the rear end 114 of the machine 110. Alternatively, the drive wheel assemblies 130 could be located at or near the front end 112 of the machine 110.

The machine 110 is equipped with left- and right-side steer wheel assemblies 138. Each steer wheel assembly 138 includes a pivot assembly 140, a steer wheel 142, and a tire 144 mounted to the steer wheel 142. It is noted that wheels having a ground-engaging surface, and thus not requiring a separate tire, are known in the art. Each steer wheel assembly 138 is mounted to the chassis 116 such that the steer wheel 142 can rotate relative to the chassis 116 as well as pivot freely about an upright (vertical or near-vertical) axis. The steer wheel assemblies 138 function as casters and therefore passively steer the machine 110. As noted above, the principles described herein are also applicable to a non zero-turn mower (not shown) using a conventional steering linkage to pivot (i.e., actively steer) some or all of the wheels.

The machine 110 is equipped with suitable electric connections, controls, and switching equipment to permit the operator to control the drive functions of the machine 110. The machine 110 includes a left drive motor controller and a right drive motor controller (not visible in the drawings). Each of these drive motor controllers includes a electric power connection to the electric power pack 128 as well as connections to operator controls as described below. Each drive motor controller is operable to receive a command signal from an operator control and to provide electric power to drive its associated drive wheel assembly 130 at the commanded wheel speed and direction.

The machine 110 includes a body 150 or superstructure positioned above the chassis 116.

The body 150 includes a battery cover assembly 152 which encloses the electric power pack 128. A control pedestal 154 is mounted on top of the battery cover assembly 152.

A foot deck 158 is mounted to the chassis 116 aft of the battery cover assembly 152. This serves as a support for the operator's feet. As illustrated, it may be provided with a raised tread structure to increase traction and avoid slippage. The battery cover assembly 152, the control pedestal 154, and the foot deck 158 collectively define an "operator station" 156 which functions to support the operator to provide access to machine controls during operation.

The body 150 includes left and right fenders 162, 164 respectively which flank the left and right sides of the control pedestal 154. The left fender 162 is topped by a left console 166 and the right fender 164 is topped by a right console 168.

The body 150 carries one or more operator controls within reach of the operator station 156. The primary operator controls include a pair of steering levers 170, one for the left side and one for the right side. Each steering lever 170 is generally L-shaped and includes a vertical section pivotally mounted to the control pedestal 154, and a horizontal section which extends from the top of the vertical section towards the centerline X of the machine 110. Each steering lever 170 is pivotally mounted such that it can move in a fore-aft direction to control drive wheel speed as described above.

Each steering lever 170 is further pivotally mounted so that it can move in a lateral direction between an outboard parking position and a inboard use position. Optionally, the machine 110 may be equipped with parking switches as described above.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the control pedestal 154 or to the left or right consoles 166, 168.

Any of the outdoor power machines described herein may be may be equipped with one or more implements, defined generally as a device attached to or carried by the machine and operable to cut, shape, load, lift, move, or transport material. Nonlimiting examples of implements include mowing decks, plows, disks, scarifiers, rippers, aerators, dethatchers, blades, buckets, scrapers, or blowers.

Figure 9:
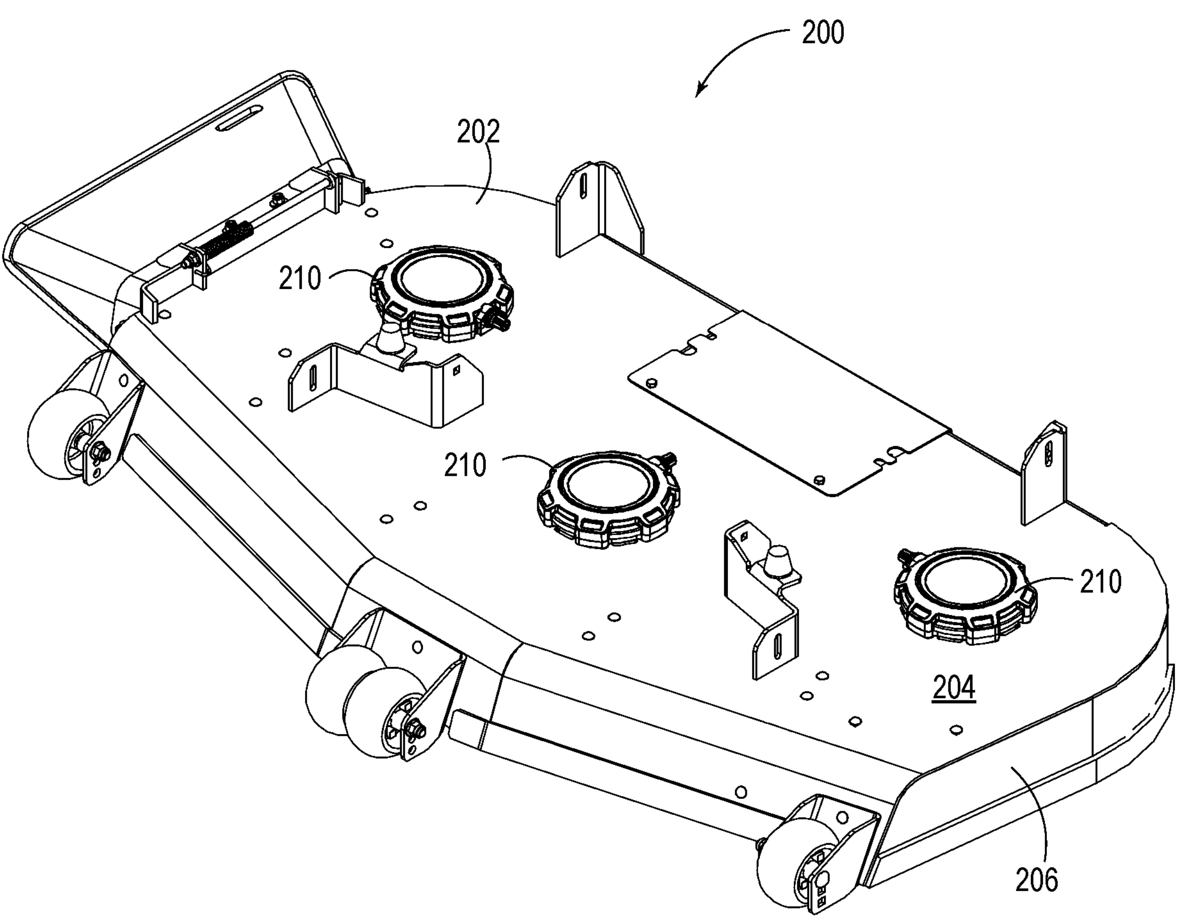
FIG. 9 is a perspective view of an exemplary mowing deck.
Figure 10:
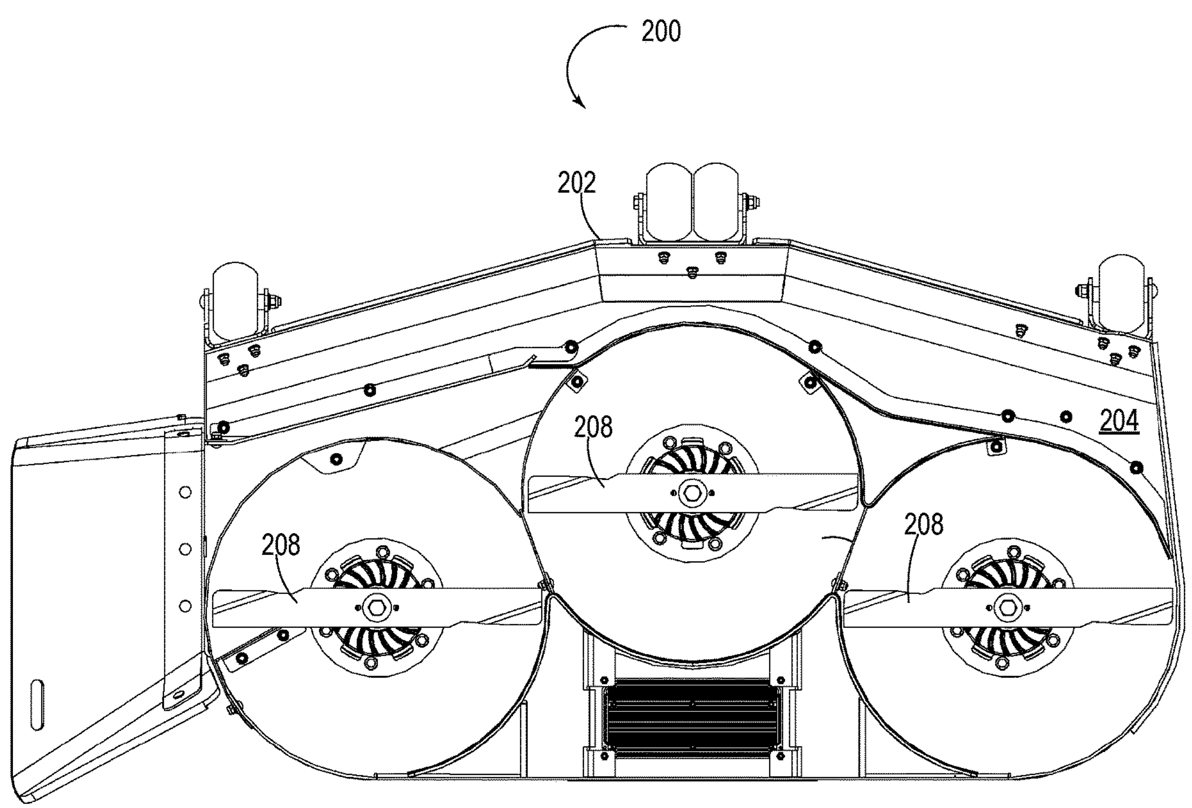
FIG. 10 is a bottom plan view of the mowing deck of FIG. 9.

In the illustrated example, the machine 10 or 110 is equipped with a mowing deck assembly 200 (FIGS. 9, 10). It includes a deck 202 which is an open-bottomed enclosure including a top panel 204 and a peripheral wall 206.

The deck 202 has a nominal designated width which may be selected to provide a desired cutting swath. Non-limiting examples of suitable deck widths include 48 inches, 52 inches, 60 inches, or 72 inches.

One or more mowing blades 208 are rotatably mounted on the underside of the top panel 204. The mowing blades 208 are positioned in a side-by side configuration such that their tips will not collide in operation. The mowing blades 208 may be positioned to have some overlap in at least one dimension so as to prevent un-mowed strips during mower operation. The dimensions of the individual mowing blades 208 are selected to provide adequate structural strength at selected operating speed, (e.g. 3600 RPM). Generally, the size of the individual mowing blades 208 is equal to the deck width divided by the number of mowing blades 208, with some additional diameter provided to accommodate for swath overlap. For example, a deck 202 having a nominal width of 60 inches may use three mowing blades 208 each having a diameter of 20.5 inches.

Means are provided for driving the mowing blades 208. Nonlimiting examples of suitable drive methods include mechanical, hydraulic, or electric devices. In the illustrated example, each mowing blade 208 is directly driven by its own individual electric blade motor 210.

The mowing deck assembly 200 is connected to the chassis via a deck lift. The deck lift is operable to position the mowing blades 208 at a preselected distance above the ground plane G of the machine. Typical examples include a cutting height in the range of approximately 1 inch to approximately 6 inches. The deck lift is also operable to lift the mowing deck assembly 200 well above any intended cutting height so that the machine can traverse obstacles, travel along a road to a worksite, or be loaded or unloaded from a trailer or storage building. This is referred to as a "travel position".

In the example shown in FIGS. 1-4, a deck lift 230 includes a foot pedal 232 to raise the deck lift 230. A removable pin 234 is insertable into a selected hole in a blade height adjuster 236. The position of the pin 234 determines a cutting height by blocking the deck lift 230 at a specific position. An uplock lever 238 is provided to selectively lock and release the deck lift 230 in the travel position.

Figure 5:
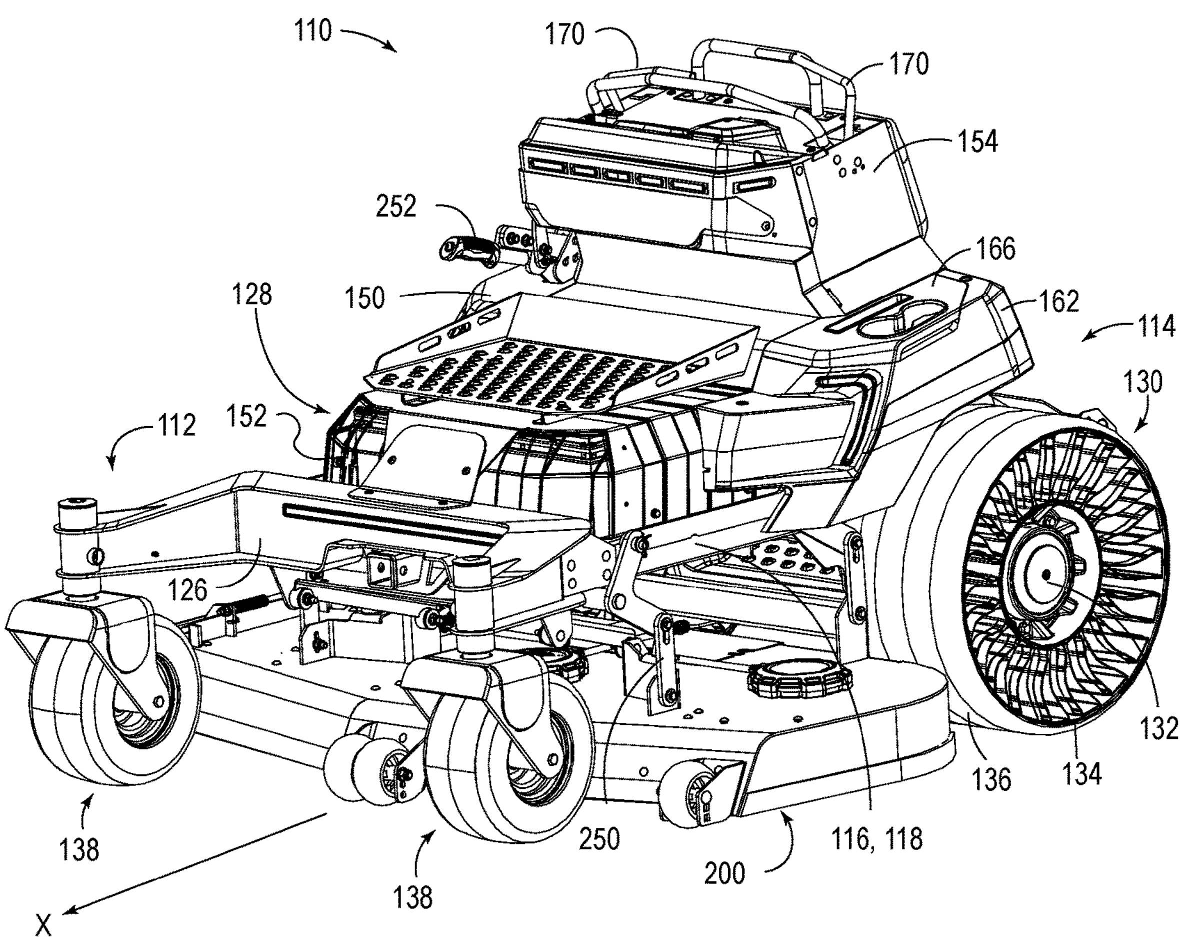
FIG. 5 is a front perspective view of an exemplary stand-on zero-turn outdoor power machine.
Figure 6:
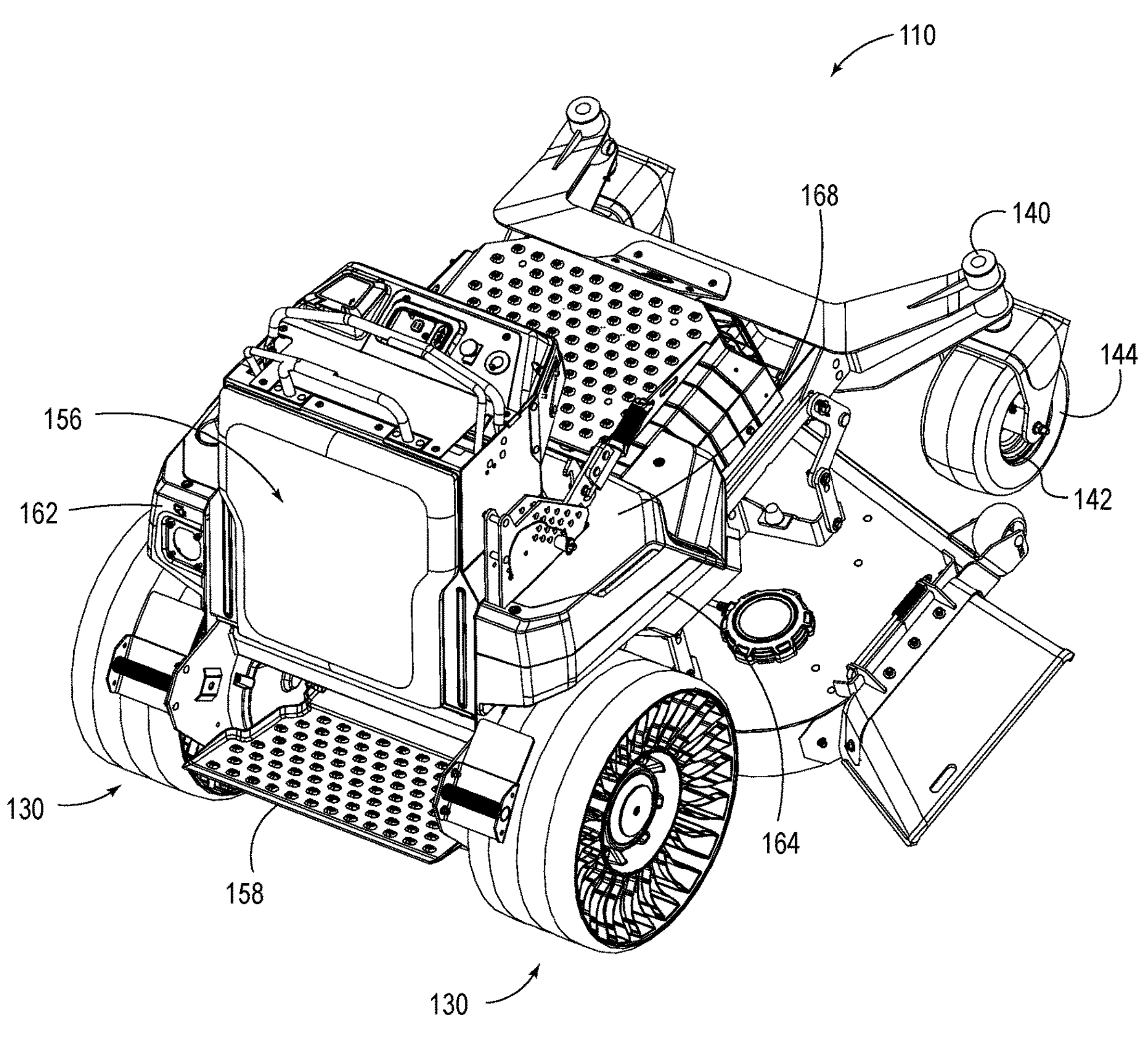
FIG. 6 is a rear perspective view of the machine of FIG. 5.
Figure 7:
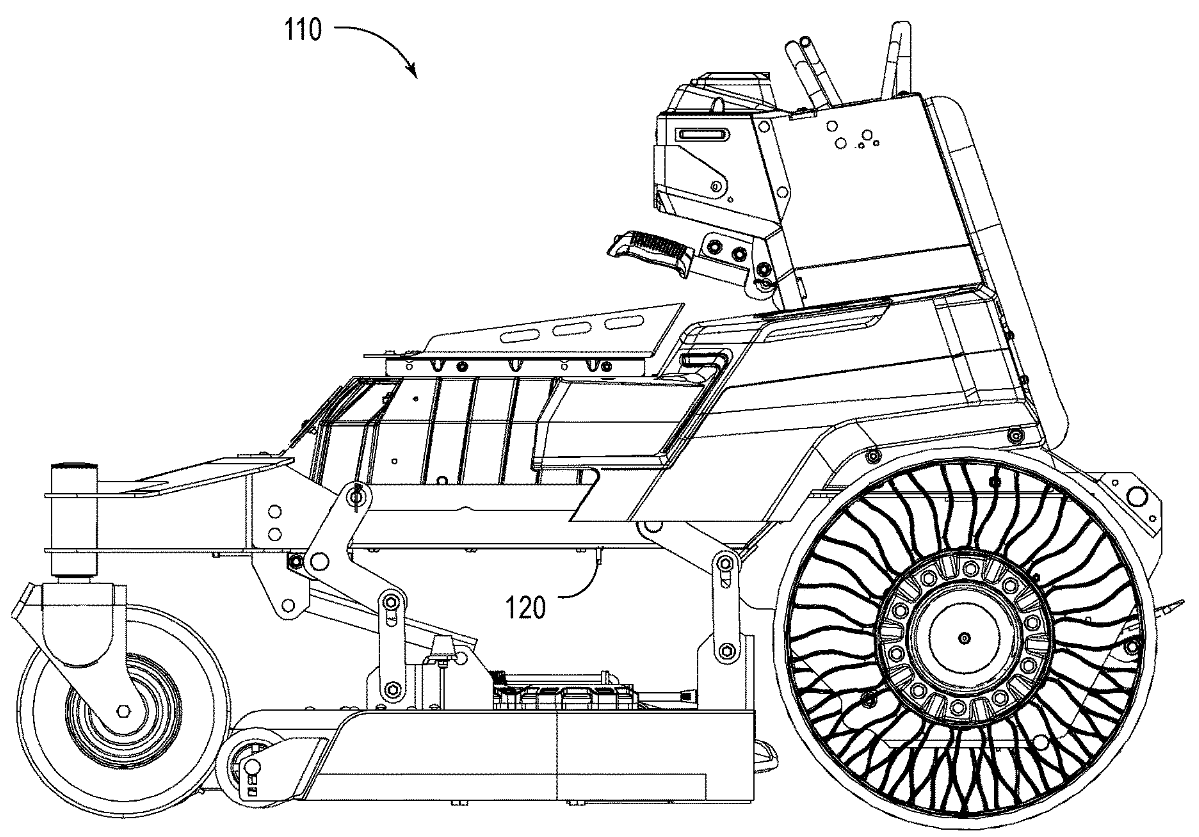
FIG. 7 is a side elevation view of the machine of FIG. 5.
Figure 8:
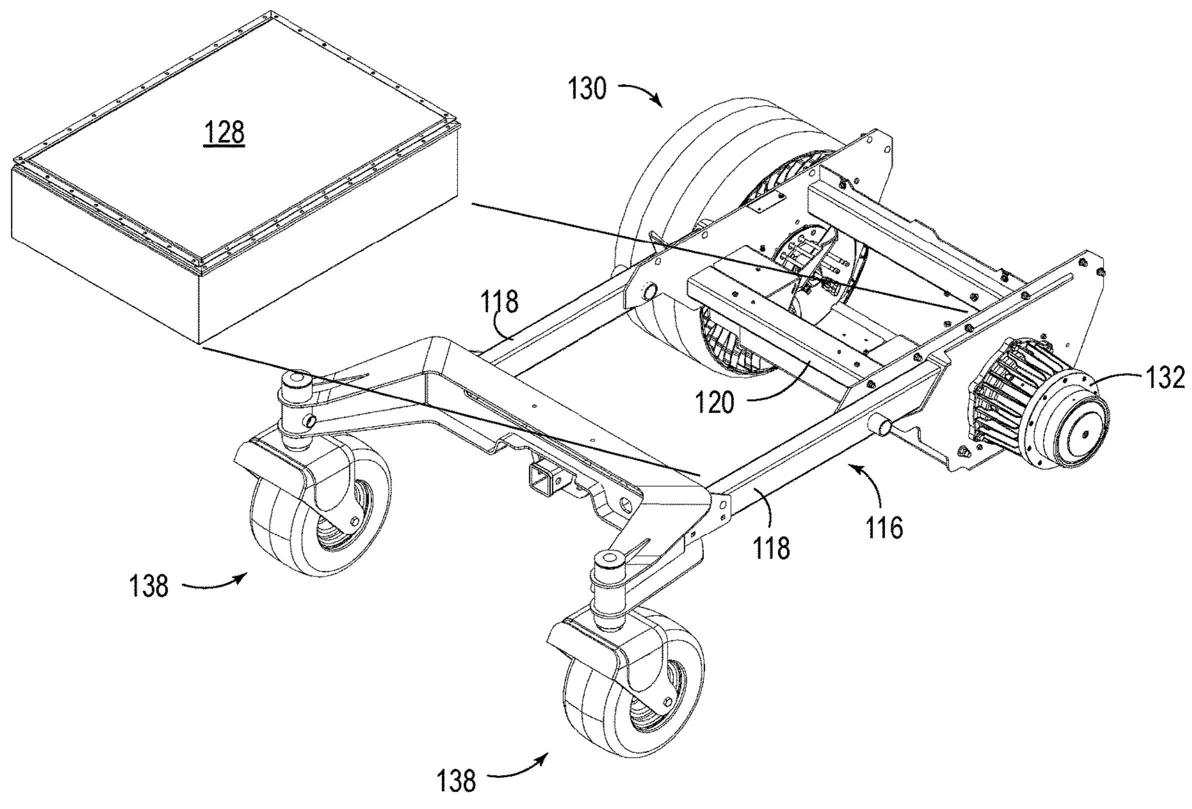
FIG. 8 is a perspective view of a chassis of the machine of FIG. 5.

In the example shown in FIGS. 5-7, the mowing deck assembly 200 is connected to the chassis 116 via a deck lift 250. The deck lift 250 is similar to the deck lift 230 described above, the primary difference being that is operated by a hand lever 252 as opposed to a pedal.

In addition to the mowing deck assembly 200, the outdoor power machine 10 or 110 can be equipped with various functional accessories, some of which may be power-operated. To facilitate this function, the outdoor power machine 10 or 110 may incorporate an "electric power takeoff" or "ETO" assembly 300. For purposes of clarity, the ETO assembly 300 will be discussed with respect to machine 10; however, such description also applies to machine 110.

Figure 11:
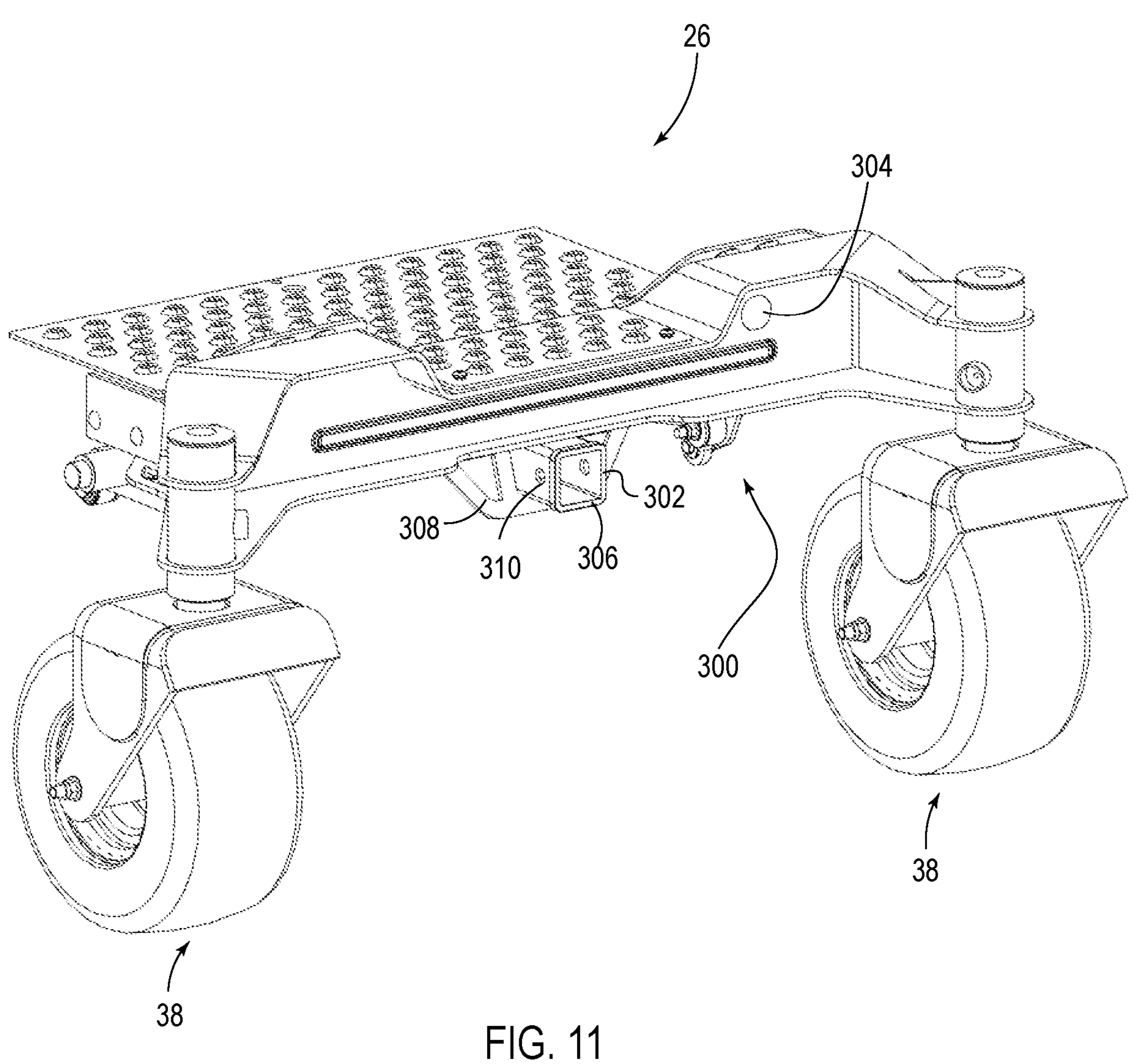
FIG. 11 is a perspective view of a front axle assembly of the outdoor power machine of FIG. 1.

Referring to FIG. 11, the ETO assembly 300 includes a physical mount 302 and an electric receptacle 304. As will be described in more detail, these two components permit an accessory to be attached to the outdoor power machine 10 and provided with electric power.

Nonlimiting examples of devices that could be connected to the ETO 300 include leaf blowers, sprayers, dethatchers, aerators, power inverters, articulated dump buckets, or mowers.

The physical mount 302 (alternatively referred to as a receiver) securely attached to the front axle assembly 26. In the illustrated example, the receiver 302 takes the form of a short section of heavy-wall square steel tubing, similar in construction to a conventional hitch receiver. It is aligned axially and has a front opening 306. The receiver 302 is welded, bolted, or otherwise secured to the front axle assembly 26. In the illustrated example, a reinforcement bracket 308 extends between the receiver 302 and the front axle assembly 26.

The receiver 302 is configured such that an accessory can be removably attached thereto. As used herein, the term "removably attached" refers to the ability of an object to be connected or disconnected without tools with a minimal use of tools. In other words, a removable attachment of one object to the other does not require major deconstruction or fabrication for removal. An example of a removable attachment would be a connection utilizing a latch or a securing element such as a quick release pin, a hitch pin, or a bolt.

In the illustrated example, the receiver 302 includes a pair of coaxial holes 310 which are sized and shaped to receive a hitch pin, bolt, or other similar securing element to secure an accessory to the receiver 302.

The electric receptacle 304 has a high voltage (e.g. 82V) electric connection to the electric power pack 28. It also includes appropriate physical and electric connections to permit a power cable (not shown) to be connected thereto. The connection to the electric power pack 28 may be controlled by a switch (not shown) mounted on the outdoor power machine 10. When the switch is "on" (closed), the electric receptacle 304 has battery voltage across its terminals. This connection may be suitable for high-power applications. In one example, it can support a 100 Amp draw at 82 Volts, e.g., an 8200 Watt load. It can thus be used to power an accessory having at least one of an electric motor and an electric actuator.

As shown in FIGS. 12-16, a storage plate 330 is pivotally connected to the rollover protection system 60 behind the seat 54. The storage plate 330 is moveable between a non-use position to allow access to a storage container 332 in the rear console 63 and a use position, where the storage plate 330 covers the storage container 332 and allows a user to carry items (such as tools, tanks, sprayers, and other implements) on top thereof. The storage plate 330 is designed to carry up to three hundred pounds and more particularly up to two hundred and fifty pounds.

The storage plate 330 includes a base 334, spaced-apart sidewalls 336, 338, and a back wall 340. The base 334 may be smooth or, as shown, include treads 342 to provide friction and prevent items from sliding off the base 334. It should be appreciated that any suitable type of tread for providing friction and preventing items thereon from sliding off may be used. Sidewall 336 is pivotally connected to a left side 344 of the rollover protection system 60 by pin 346 and sidewall 338 is connected to a right side 348 of the rollover protection system 60 by pin 350 to allow the storage plate 330 to move between the use and non-use positions.

Restraints 352, 354 are used to prevent the storage plate 330 from moving below a certain position when loaded in the use position. Restraint 352 extends between and is connected to sidewall 336 and the left side 344 of the rollover protection system 60 and restraint 354 extends between and is connected to sidewall 338 and the right side 348 of the rollover protection system 60. As illustrated, the restraints 352, 354 are in the form of a cable; however, it should be appreciated that any suitable type of restraint may be used, including bands, mechanical levers, rope, etc.

The base 334 of the storage plate 330 further includes a pair of spaced-apart indentions 356, 358. The indentions 356, 358 are configured to extend a portion of the storage plate 330 below a bottom surface 360 of the storage plate 330. The indentions 356, 358 act as one-half of a stop 362 to further aid in preventing the storage plate 330 from moving below a certain position when loaded in a use position. The second half of the stop 362 is positioned on a top surface 364 of the rear console 63 in the form of spaced-apart protrusions 366, 368. The protrusions 366, 368 may be integrally formed with the rear console 63 or may be secured to the top surface 364 by fasteners and/or adhesives. The protrusions 366, 368 are positioned to mate up with the indentions 356, 358 such that when the storage plate 330 is in the use position, indention 356 mates up with protrusion 366 and indention 358 mates up with protrusion 368.

Storage container 332 may be integrally formed in the rear console 63 or may be a separate "pop-in" structure that is secured to the rear console 63 by fasteners and/or adhesives. The storage container 332 includes a drain 370 to drain water and/or moisture from the storage container 332 and allows a user to store tools, gloves, and any other desired item therein. Moving the storage plate 330 to the use position, secures the items in the storage container 332 and prevents the items from bouncing out.

Figure 17:
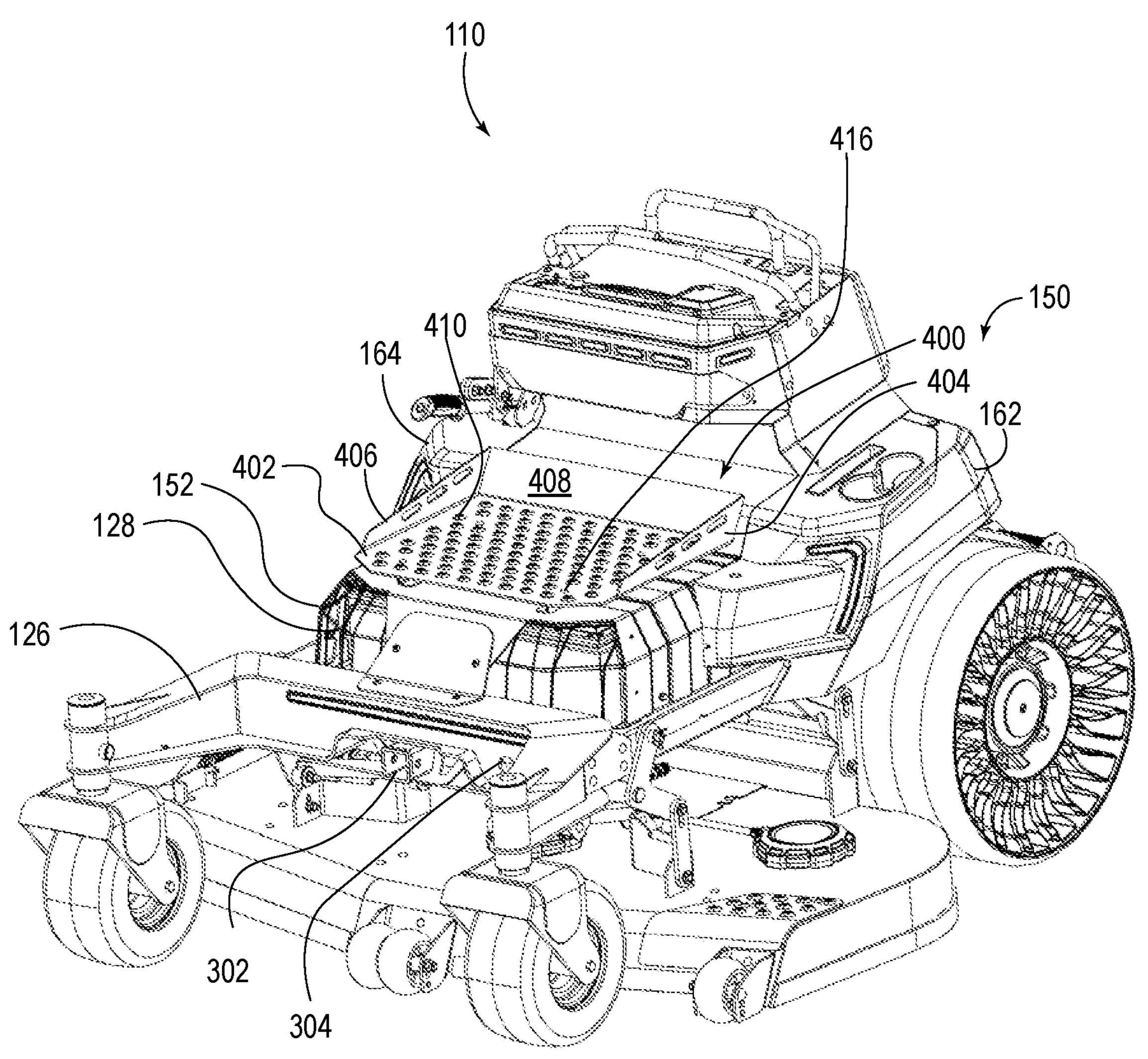
FIG. 17 is a perspective view of the machine of FIG. 5 showing a storage plate.
Figure 18:
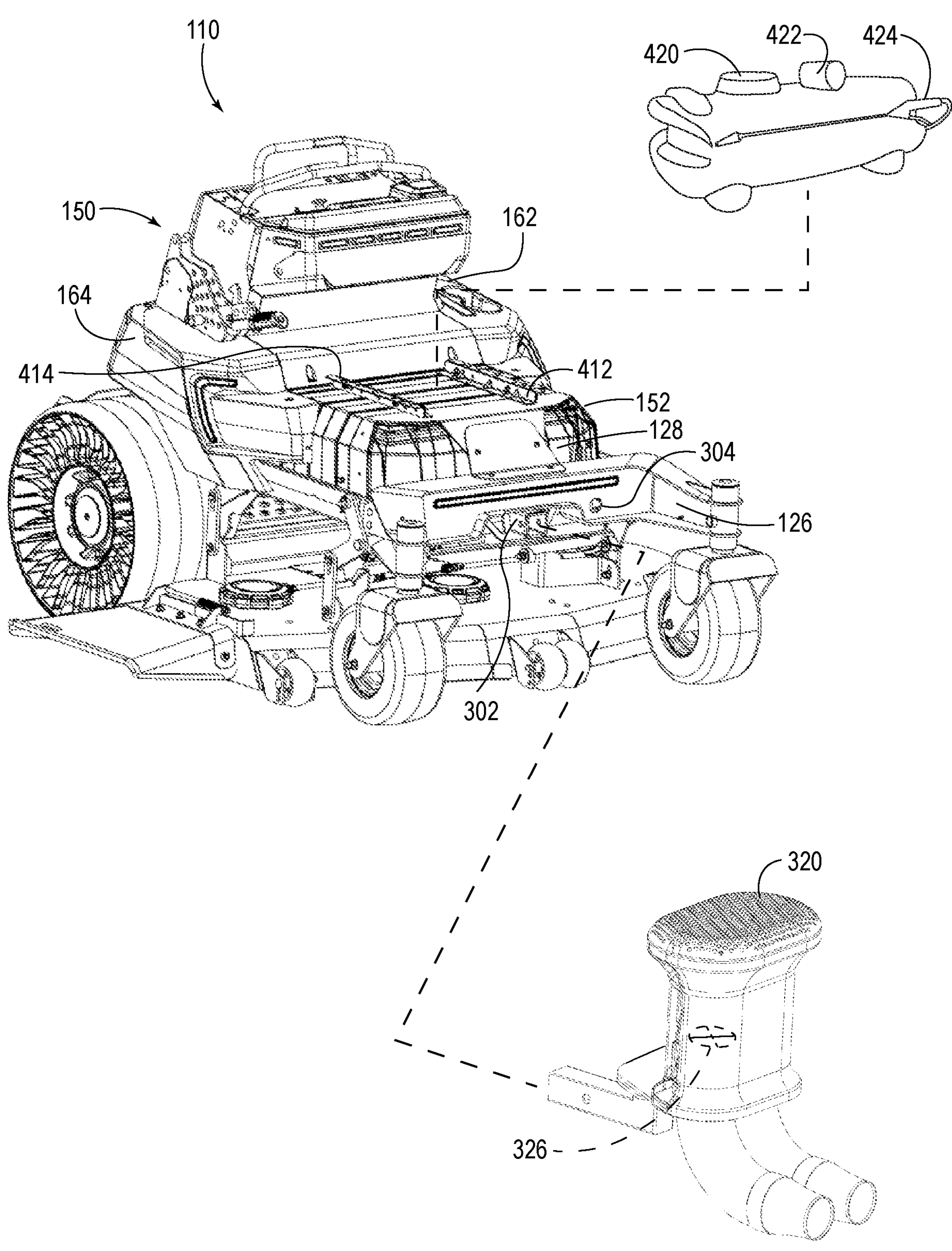
FIG. 18 is a perspective of the machine of FIG. 17, with a blower and spray tank.

Referring to FIGS. 17 and 18, machine 110 includes a storage plate 400 much like the storage plate 330 described above. Storage plate 400 includes a base 402, spaced-apart sidewalls 404, 406, and a back wall 408. The base 402 may be smooth or, as shown, include treads 410 to provide friction and prevent items from sliding off the base 402. It should be appreciated that any suitable type of tread for providing friction and preventing items thereon from sliding off may be used. The storage plate 400 is designed to carry up to three hundred pounds and more particularly up to two hundred and fifty pounds.

The storage plate 400 is connected to the battery cover assembly 152 by spaced-apart rails 412, 414. More particularly, the storage plate 400 is connected to the rails 412, 141 by removeable fasteners 416. In turn, the rails 412, 414 may be secured to the battery cover assembly 152 by fasteners, adhesives, welding or other suitable method. The rails 412, 414 allow the storage plate 400 to be removed from the machine 110 and a different implement installed thereon.

For example, as illustrated in FIG. 18, the storage plate 400 is removed and a sprayer tank 420 is connected to the rails 412, 414. The sprayer tank 420 may also be carried by and/or connected to the storage plate 400. Additionally, a blower 320 is secured to the machine 110 by inserting receiver mount 336 into receiver 302. Both the sprayer tank 420 and blower 300 may be powered by the ETO assembly 300. As shown, the sprayer tank 420 includes a pump 422 and a wand 424 that would be powered by the ETO assembly 300. Likewise, blower 320 includes at least one electrically-powered fan 326 that would also be powered by the ETO assembly 300.

In use, a user can use the wand 424 for spot spraying chemicals such as weed killer and herbicides or can combine the sprayer tank 420 and blower 320 to create a fogger that can be used to fog plants, bushes, and other vegetation.

The foregoing has described an outdoor power machine. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. An outdoor power machine, comprising:

a chassis including main frame rails;

two or more drive wheel assemblies physically mounted to the chassis, each drive wheel assembly coupled to an electric motor;

an electric power pack configured to supply electric energy to the electric motors;

one or more steer wheels; and at least one storage plate connected to the outdoor power machine, the storage plate configured to carry an item thereon; wherein the at least one storage plate includes first and second spaced-apart indentions, the indentions extending below a bottom surface of the at least one storage plate.

2. The outdoor power machine of claim 1, further including:

an electric power takeoff, including:

a receiver attached to the chassis and configured to removably connect an accessory; and an electric receptacle electrically coupled to the electric power pack.

3. The outdoor power machine of claim 1, wherein the at least one storage plate is pivotally connected to a rear of the outdoor power machine.

4. The outdoor power machine of claim 3, wherein the at least one storage plate is pivotally connected to a rollover protection system of the outdoor power machine.

5. The outdoor power machine of claim 1, wherein the at least one storage plate is connected to a battery cover assembly covering the electric power pack.

6. The outdoor power machine of claim 5, wherein the at least one storage plate is connected to the battery cover assembly by rails positioned between the at least one storage plate and the battery cover assembly.

7. The outdoor power machine of claim 1, wherein the at least one storage plate includes a base, first and second spaced-apart sidewalls, and a back wall.

8. The outdoor power machine of claim 7, wherein the base of the at least one storage plate includes treads to provide friction and prevent items from sliding off of the base.

9. The outdoor power machine of claim 1, further including a body positioned above the chassis, the body including a left fender, a right fender, and a rear console interconnecting the left and right fenders.

10. The outdoor power machine of claim 9, wherein the rear console includes a storage container positioned therein.

11. The outdoor power machine of claim 10, wherein the at least one storage plate is pivotally connected to the outdoor power machine and pivots between a use position where the at least one storage plate covers the storage container and a non-use position where the at least one storage plate does not cover the storage container.

12. The outdoor power machine of claim 1, further including a body positioned above the chassis, the body including a rear console interconnecting first and second spaced-apart fenders.

13. The outdoor power machine of claim 12, wherein the rear console includes first and second spaced-apart protrusions extending from a top surface of the rear console, and wherein in the use position, the first protrusion mates with the first indention to form a first stop and the second protrusion mates with the second indention to form a second stop to prevent the at least one storage plate from moving below a pre-determined level when weight is applied to the at least one storage plate.

14. An outdoor power machine, comprising:

a chassis including main frame rails;

two or more drive wheel assemblies physically mounted to the chassis, each drive wheel assembly coupled to an electric motor;

an electric power pack configured to supply electric energy to the electric motors;

one or more steer wheels; and at least one storage plate connected to the outdoor power machine, the storage plate configured to carry an item thereon; wherein the at least one storage plate includes at least one restraint to prevent the at least one storage plate from pivoting below a pre-determined level when weight is applied to the at least one storage plate.

15. An outdoor power machine, comprising:

a chassis including main frame rails;

two or more drive wheel assemblies physically mounted to the chassis, each drive wheel assembly coupled to an electric motor;

an electric power pack positioned between the main frame rails and configured to supply electric energy to the electric motors;

one or more steer wheels;

at least one storage plate connected to the outdoor power machine, the storage plate configured to carry an item thereon; and a body positioned above the chassis, the body including a rear console interconnecting first and second spaced-apart fenders, wherein the rear console includes first and second spaced-apart protrusions extending from a top surface of the rear console, and wherein in the use position, the first protrusion mates with a first indention to form a first stop and the second protrusion mates with a second indention to form a second stop to prevent the at least one storage plate from moving below a pre-determined level when weight is applied to the at least one storage plate.

16. The outdoor power machine of claim 15, wherein the at least one storage plate is pivotally connected to a rollover protection system of the outdoor power machine.

17. The outdoor power machine of claim 15, wherein the at least one storage plate is connected to a battery cover assembly by rails positioned between the at least one storage plate and a battery cover assembly.

* * * * *